C. F. KILGORE.
BOAT PROPELLING KIT.
APPLICATION FILED MAR. 13, 1915.
1,164,361.
Patented Dec. 14, 1915.
2 SHEETS—SHEET 1.
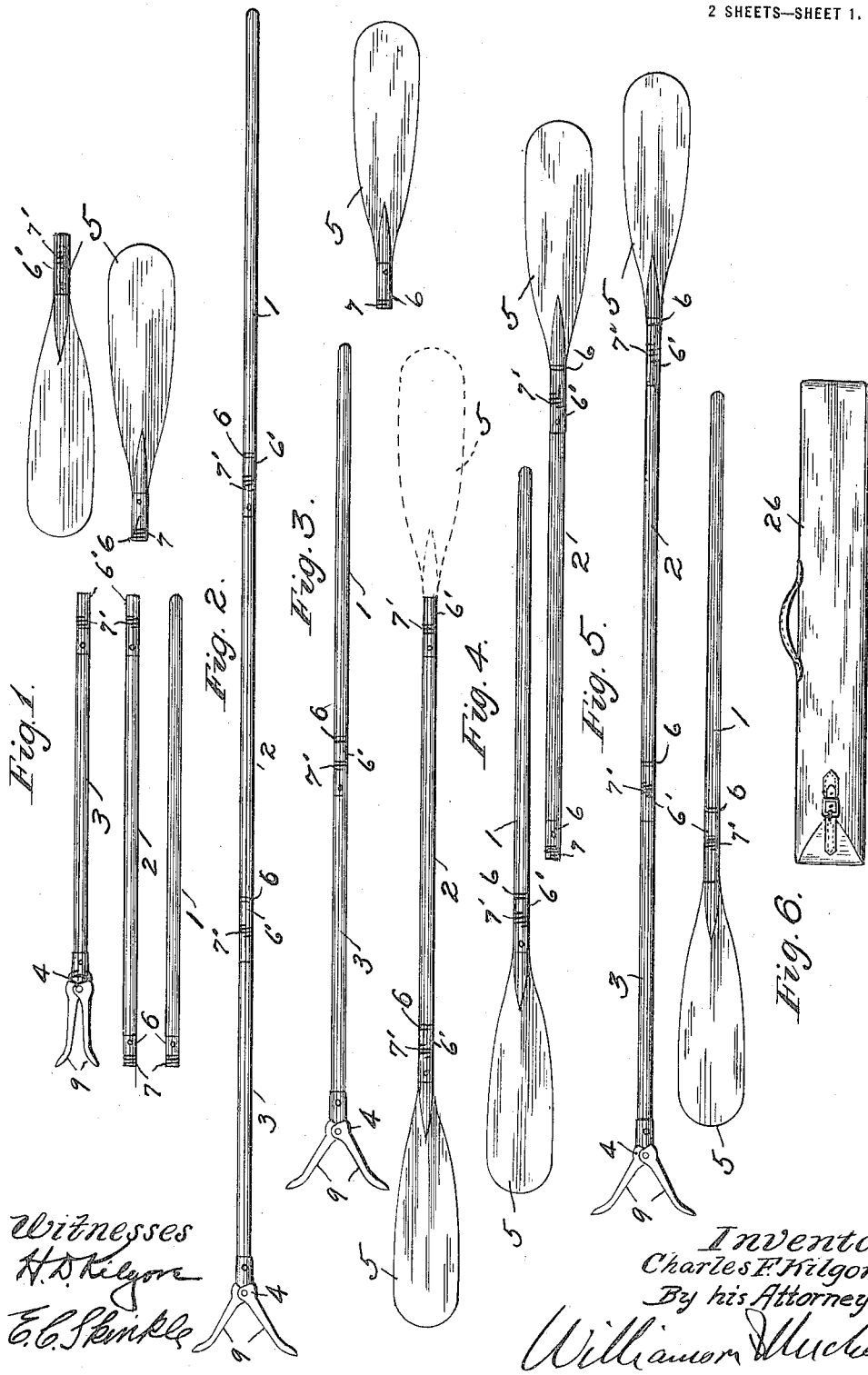
Witnesses
H. D. Kilgore
E. C. Sprinkle
Inventor
Charles F. Kilgore
By his Attorneys
Williamson & Muchant

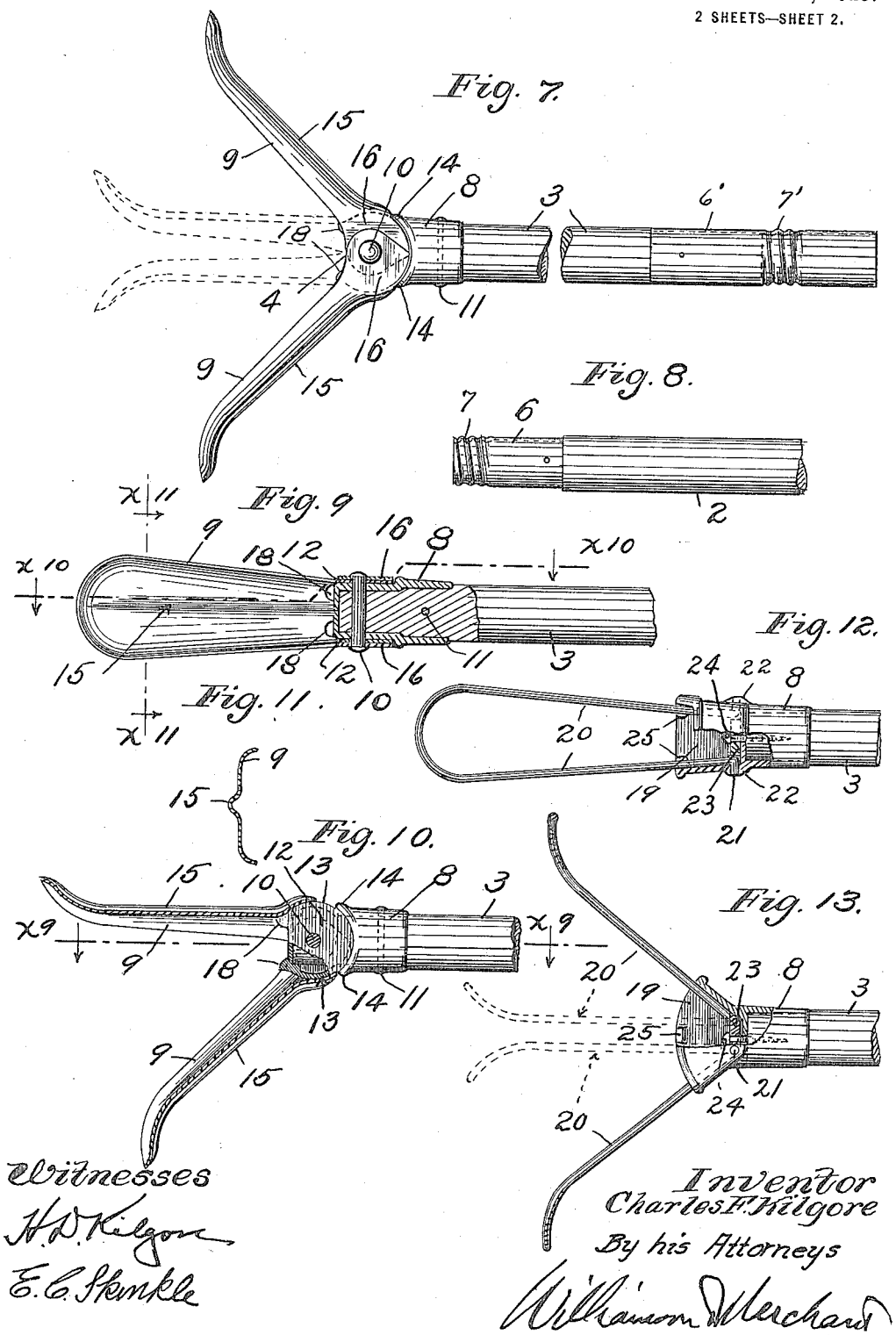

UNITED STATES PATENT OFFICE.

CHARLES F. KILGORE, OF MINNEAPOLIS, MINNESOTA.

BOAT-PROPELLING KIT.

1,164,361.   Specification of Letters Patent.   Patented Dec. 14, 1915.

Application filed March 13, 1915. Serial No. 14,120.

*To all whom it may concern:*

Be it known that I, CHARLES F. KILGORE, a citizen of the United States, residing at Minneapolis, in the county of Hennepin and State of Minnesota, have invented certain new and useful Improvements in Boat-Propelling Kits; and I do hereby declare the following to be a full, clear, and exact description of the invention, such as will enable others skilled in the art to which it appertains to make and use the same.

My invention has for its object to provide a kit for propelling water crafts; and, to this end, it consists of the novel construction and arrangement of parts hereinafter described and defined in the claims.

In the accompanying drawings, which illustrate the invention, like characters indicate like parts throughout the several views.

Referring to the drawings:—Figure 1 shows the entire kit with the several units thereof separated; Fig. 2 shows certain units of the kit assembled to afford a long push pole; Fig. 3 shows all of the units of the kit assembled to afford a relatively short push pole, and a double paddle, one of the paddle blades being indicated by means of broken lines, and is shown detached from the respective pole section by means of full lines; Fig. 4 shows certain units of the kit assembled to afford a pair of oars; Fig. 5 shows all of the units of the kit assembled to afford a combined push pole and paddle, and a paddle; Fig. 6 shows the case in which the kit is carried; Fig. 7 is an enlarged view of the push pole head and a portion of the jointed pole to which said head is attached, the wings of said head being shown in a folded position by means of broken lines; Fig. 8 is a fragmentary view of one of the pole sections; Fig. 9 is a view partly in longitudinal section taken on the line $X^9 X^9$ of Fig. 10; Fig. 10 is a view partly in longitudinal section taken on the irregular line $X^{10} X^{10}$ of Fig. 9; Fig. 11 is a transverse section taken on the line $X^{11} X^{11}$ of Fig. 9; Fig. 12 is a modification of the push pole head, some parts being broken away and some parts being shown in section; and Fig. 13 is a view partly in longitudinal section taken on the line $X^{13} X^{13}$ of Fig. 12, some parts being shown in different positions by means of broken lines.

The several units of the kit comprise a jointed pole of three sections, 1, 2 and 3, a push pole head 4 and two paddle blades 5. The joints detachably connecting the several pole sections, comprise a male ferrule and a female ferrule 6 and 6' respectively, secured to the respective pole sections. External screw threads 7 are formed on the male ferrules 6 and internal screw threads 7' are formed on the female ferrules 6' which, when turned together, prevent separation of the pole sections under pulling strains. By reference to Fig. 1 it will be noted that the pole section 1 is provided, at one end, with a male ferrule 6, while the pole section 2 is provided, at one end, with a male ferrule 6 and at its other end with a female ferrule 6', and the pole section 3 has secured to one of its ends a female ferrule 6' and to its other end is secured the head 4. It will also be noted that one of the paddle blades 5 is provided with a male ferrule 6, making it possible to detachably secure said paddle blade to either of the pole sections 2 and 3, while the other of said paddle blades is provided with a female ferrule 6', making it possible to secure this paddle blade to either of the pole sections 1 and 2.

The preferred form of push pole head 4, as shown in Figs. 7 to 11 inclusive, comprises a socket 8 and a pair of wings 9 pivotally connected to said socket by a rivet 10 for spreading movement under a pushing strain and for folding movement under a pulling strain. The socket 8 is telescoped onto one end of the pole section 3 and is permanently secured thereto by a rivet 11. Diametrically opposite faces of the socket 8 are flattened at 12 and the surfaces of said socket, between its flattened faces, are formed segmental, as indicated at 13. Integrally formed on the outer face of the socket 8, at the junction with the flattened and segmental portions of said socket with the body thereof, are segmental stop beads 14.

The wings 9 are pressed from sheet metal into concavo convex form in cross section, as best shown in Fig. 11. Reinforcing ribs 15 are pressed from the longitudinal transverse center of said ribs. Also integrally formed with the wings 9 are interlapping hinge lugs 16, which embrace the flattened faces 13 of the socket 8 and are pivotally secured thereto by the rivet 10, which extends axially through said faces.

The wings 9, between the hinge lugs 16, are pressed into segmental form and rest upon the segmental faces 13, which afford bearings therefor. These segmental surfaces also engage the stop beads 14 to limit the spreading movement of the wings 9. Stops 18, integrally formed with the socket 8, engage the inner faces of the wings 9, just forward of their hinge lugs 16, to limit their folding movement under pulling strains, and also to prevent said wings from turning past the longitudinal center of the push pole. The free end portions of the wings 9 are curved outwardly from each other, as best shown in Fig. 7, so as to spread when pressed against an object, thereby affording a wide boat resisting force under pushing strains.

In the modification, illustrated in Figs. 12 and 13, the socket 8 is provided with a bell shape mouth 19, within which are mounted the inner end portions of a pair of wings 20. These wings are each formed from a single piece of heavy wire, bent upon itself, with its prongs bent laterally to afford trunnions 21 journaled in the seats 22, formed in the side walls of said mouth. The inner end portions of the wings 20 engage the bottom plate of the socket 8 to relieve the strain on the trunnions 21 under pushing strains on the wings 20. The trunnions 21 are secured against removal from the seats 22 by a metal block 23 mounted on the bottom plate of the socket 8 and held in position by a wood screw 24, passed through an aperture in said bottom plate, and screwed into the adjacent end of the pole section 3. This screw 24 also holds the socket 8 in position on the pole section 3. Stop lugs 25, integrally formed with the inner walls of the mouth 19, limit the folding movement of the wings 20.

The kit just described is especially intended for use in propelling light water crafts, such as duck boats, row boats, canoes, rafts, and the like. It is also intended to be carried on motor boats and sail boats for use in case of emergency and in making landings and in leaving docks. When not in use the entire kit, or parts thereof, are packed in a case 26.

From the foregoing description it is evident that the several units of the kit may be very quickly assembled to afford either a relatively long or short push pole, having a collapsible head, a push pole having at one end a collapsible head and at its other end a paddle blade, a single paddle, double paddles, or a pair of oars, all of which are interchangeably usable. The push pole, with the collapsible head, is especially adapted for hunters in poling so-called duck boats through shallow water, wild rice, and the like. The spreading of the collapsible head, under pushing strains, affords a wide boat resisting force, especially desirable when the bottom of the lake is soft and muddy. The diverging wings of the collapsible head will also gather clumps of wild rice and other growth, which also affords a good base of resistance in poling the boat. The folding of the wings, under pulling strains, will release all susbstances gathered under pushing strains, thereby making the poling of the boat an extremely easy matter. As is well known, in propelling boats by means of an ordinary push pole, the forward movement of the boat is often greatly impeded by the sticking of the pole in the soft bottom of the lake, requiring considerable pulling force to release the same. By the sticking of a push pole in the mud, many accidents are also caused, either by the upsetting of the boat, or the pulling of the occupant therefrom.

When the kit is packed in its case 26, it occupies very little space and is easily carried.

What I claim is:—

1. A kit for propelling water crafts comprising a jointed pole, a detachable collapsible head, and a pair of detachable paddle blades, said head and detachable paddle blades being interchangeably usable.

2. A push pole having a collapsible head comprising a pole receiving socket, a pair of wings pivoted to said socket for folding movement, and stops for limiting the spreading and folding movements of said wings, said wings being formed concavo convex in cross section.

3. A push pole having a collapsible head comprising a pole receiving socket, a pair of wings pivoted to said socket for folding movement, stops for limiting the spreading and folding movements of said wings, said wings being formed concavo convex in cross section, and a rib extended longitudinally through the transverse center of each of said wings.

4. A pole having a collapsible head comprising a pole receiving socket, and a pair of wings having interlapping hinge lugs pivoted to said socket, permitting said wings to spread under a pushing strain and to fold under a pulling strain.

5. A push pole having a collapsible head comprising a pole socket, and a pair of wings, said socket having diametrically opposite flattened faces with segmental surfaces located therebetween, said wings having interlapping hinge lugs embracing the flattened faces of said socket and pivotally secured thereto, said wings also having segmental surfaces slidably mounted on the segmental surfaces of said socket, and stops for limiting the folding and spreading movements of said wings.

In testimony whereof I affix my signature in presence of two witnesses.

CHARLES F. KILGORE.

Witnesses:
JENS IKART,
HARRY D. KILGORE.

Copies of this patent may be obtained for five cents each, by addressing the "Commissioner of Patents, Washington, D. C."